April 10, 1928.

N. L. OLSON 1,665,471

VEHICLE WHEEL

Filed Feb. 16, 1927

Inventor
Nels L. Olson
By
Irving Harness
Attorney

Patented Apr. 10, 1928.

1,665,471

UNITED STATES PATENT OFFICE.

NELS L. OLSON, OF HIGHLAND PARK, MICHIGAN, ASSIGNOR TO SWEDISH CRUCIBLE STEEL COMPANY, A CORPORATION OF MICHIGAN.

VEHICLE WHEEL.

Application filed February 16, 1927. Serial No. 168,506.

It is the primary object of my invention to provide a wheel construction such as is conventionally used on motor vehicles and to couple therewith means for securing an auxiliary or dual wheel beside certain of the vehicle wheels.

It has become quite customary, in certain classes of work, to employ on the rear end of motor vehicles two pairs of driving wheels instead of two individual wheels. The purpose of this is to provide increased traction and permit operation of the vehicle over soft ground. It frequently happens, however, that it is desirable, under certain road and load conditions, to drive a motor vehicle which is equipped with dual wheels with only the conventional single pair of wheels on the rear end. My invention purposes to provide means whereby the extra pair of wheels may be easily assembled and disassembled with the conventional equipment.

With the above and other objects in view, my invention consists in the arrangement, combination and construction of the various parts of my improved device as described in the specification, claimed in my claims and shown in the accompanying drawing, in which:

Figure 1:
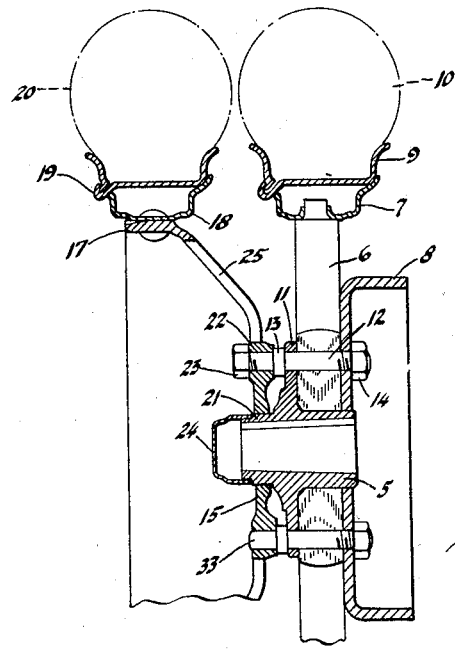
Fig. 1 is a transverse sectional view showing a dual wheel arrangement embodying my invention, parts of the wheel being broken away.
Figure 2:
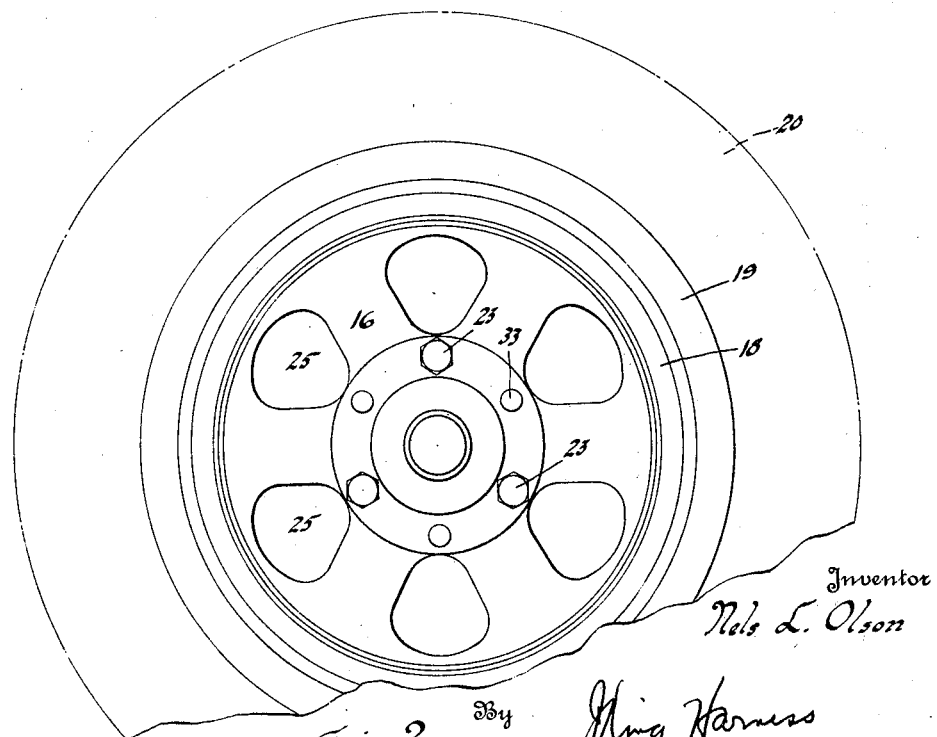
Fig. 2 is a side elevation of the auxiliary wheel utilized in my invention, parts being broken away.

I have shown a conventional wheel comprising a hub 5, spokes 6, felly 7, brake drum 8, demountable rim 9 and tire 10. The hub 5 is flanged as at 11 and bolts 12 are provided with heads 13 one side of which engages the outer face of the flange 11 and the shank extends through apertures in the flange 11, spokes 6 and brake drum 8. Nuts 14 are screwed on the ends of the bolts within the brake drum 8 so as to secure in unit assembly the hub, spokes and brake drum.

An auxiliary or dual wheel is provided which, as shown, is of the disc type embodying a central or hub portion 15, an intermediate portion 16, a circumferential flanged portion 17, a felly 18, rim 19 and tire 20. The central or hub portion 15 is apertured to fit the hub 5 as at 21 and a plurality of apertures also engage the extending portions of the bolts 12 as particularly shown in Fig. 1. Certain of these extending portions, such as 22, are provided with screw threaded ends for the engagement of nuts 23. Others of the bolts 12 are provided with plain extensions 33 which engage in apertures of the central portion 15 of the auxiliary wheel for the purpose of assisting in driving the same.

It will be readily apparent that the auxiliary or dual wheel may be easily and quickly removed by simply taking off the nuts 23, and may be again secured in place with equal simplicity and ease. If desired, a hub cap 24 may be screwed on the outer end of the hub 5.

I desire it to be understood that the auxiliary wheel may be of any type, including the spoke type of wheel. When the disc type such as I have shown herein is used, a plurality of openings 25 may be cut in the disc for the purpose of lightening it, and for the further purpose of permitting access to the tire valve of the tire on the main wheel.

It will be apparent that the shape of the disc as I have here illustrated it is somewhat conical in order that it may extend outwardly a sufficient distance to permit of the assembly of the auxiliary tire. It will also be apparent, however, that the necessity for this will depend upon the length of the hub 5.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. A device of the class described comprising a wheel having a hub portion, a plurality of bolts engaged in the hub portion having heads intermediate their ends engaging the hub and an auxiliary wheel secured on said bolts bearing against said heads and separated thereby from the first wheel.

2. A device of the class described comprising a wheel having a hub portion, a plurality of bolts engaged in the hub portion having heads intermediate their ends engaging the hub and an auxiliary wheel secured on said bolts bearing against and separated from the first wheel by said heads; said auxiliary wheel having an apertured central portion engaged over the hub.

3. A device of the class described comprising a wheel having a hub portion, a plurality of bolts engaged in the hub portion having heads intermediate their ends engaging the hub and an auxiliary wheel secured on said bolts bearing against and separated from the first wheel by said heads, said auxiliary wheel comprising a central portion, a rim portion and an intermediate portion, the central and rim portions lying in different vertical planes and the intermediate portion extending at an angle to join them.

4. A device of the class described comprising a wheel having a hub portion and a plurality of spokes extending from the hub, a plurality of bolts extended through the hub and spokes and uniting them, said bolts having heads intermediate their ends, an auxiliary wheel having apertures engaging the free ends of the bolts, some of said free ends being freely disposed longitudinally in the apertures and means for securing others of them against longitudinal movement in the apertures.

NELS L. OLSON.